(12) United States Patent
Soukal et al.

(10) Patent No.: US 8,822,930 B2
(45) Date of Patent: Sep. 2, 2014

(54) FLAT IMAGE DETECTOR AND METHOD FOR THE GENERATION OF MEDICAL DIGITAL IMAGES

(75) Inventors: Peter Soukal, Schwarzenbruck (DE); Martin Spahn, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/211,800

(22) Filed: Aug. 17, 2011

(65) Prior Publication Data

US 2012/0043465 A1    Feb. 23, 2012

(30) Foreign Application Priority Data

Aug. 17, 2010    (DE) .......................... 10 2010 034 567

(51) Int. Cl.
*G01T 1/20* (2006.01)
*G21K 4/00* (2006.01)
*G01T 1/24* (2006.01)

(52) U.S. Cl.
CPC ............... *G21K 4/00* (2013.01); *G01T 1/2018* (2013.01); *G01T 1/243* (2013.01); *G21K 2004/02* (2013.01)
USPC ....................................... 250/362

(58) Field of Classification Search
CPC .................................... G01T 1/2018
USPC ................... 250/362, 370.09, 370.11, 369
See application file for complete search history.

(56) References Cited

U.S. PATENT DOCUMENTS

| | | | |
|---|---|---|---|
| 6,442,238 B2 | 8/2002 | Meulenbrugge | 378/98.8 |
| 7,105,826 B2* | 9/2006 | Ren et al. | 250/366 |
| 7,358,500 B2 | 4/2008 | Miyata et al. | 250/366 |
| 7,405,406 B1 | 7/2008 | Nagarkar et al. | 250/366 |
| 7,834,321 B2* | 11/2010 | Yorkston et al. | 250/370.09 |
| 2011/0210256 A1* | 9/2011 | Mattson et al. | 250/363.01 |

OTHER PUBLICATIONS

Spahn, M., "Flat Detectors and Their Clinical Applications", Physics, vol. 15, pp. 1934-1947, Apr. 2, 2005.
German Office Action, Application No. 10 2010 034 567.9, 5 pages (German), Feb. 21, 2013.

* cited by examiner

*Primary Examiner* — David Porta
*Assistant Examiner* — Faye Boosalis
(74) *Attorney, Agent, or Firm* — King & Spalding L.L.P.

(57) ABSTRACT

In a flat image detector and method for the generation of medical digital images, the flat image detector is in particular suitable for a medical X-ray device and equipped with at least one active matrix (MX, MX2) made up of pixel-readout units, wherein the light generated in the scintillator (SZ) can be read out on both sides in the direction of the incoming X-ray radiation (R) in front of and behind the scintillator, with the aid of such an active matrix in each case arranged on each side of the scintillator.

17 Claims, 6 Drawing Sheets

FIG 3
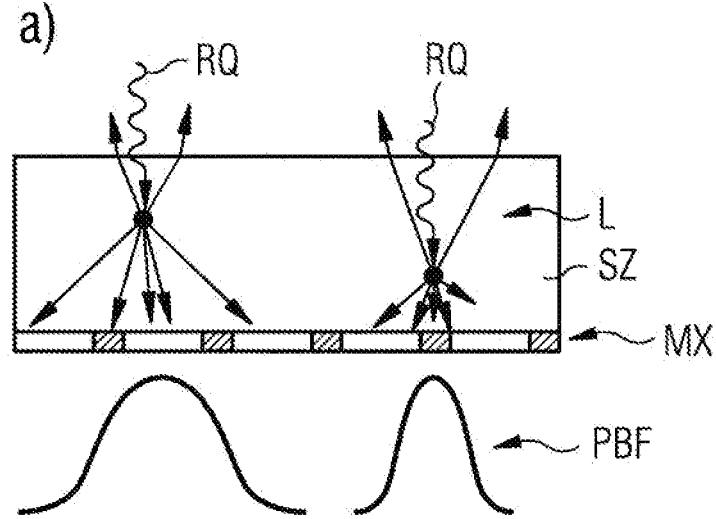
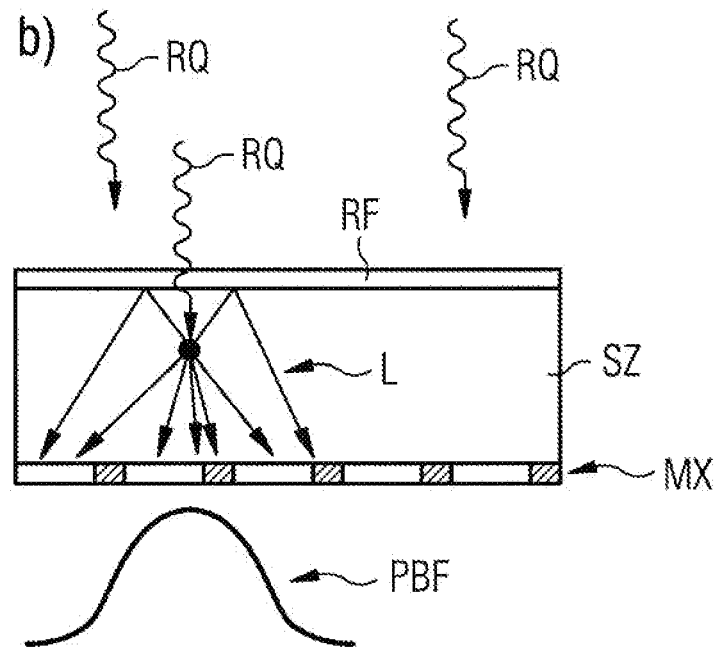

FIG 3
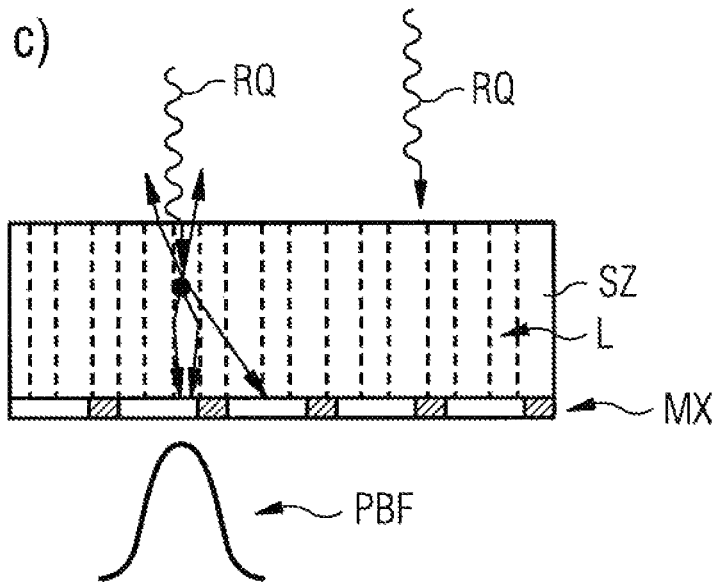
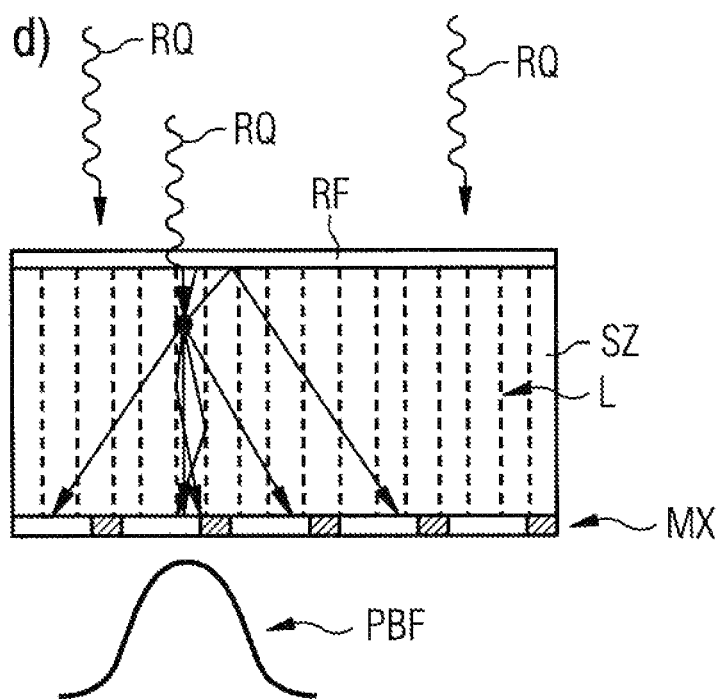

FLAT IMAGE DETECTOR AND METHOD FOR THE GENERATION OF MEDICAL DIGITAL IMAGES

CROSS-REFERENCE TO RELATED APPLICATIONS

This application claims priority to German Patent Application No. 10 2010 034 567.9 filed Aug. 17, 2010, the contents of which is incorporated herein by reference in its entirety.

TECHNICAL FIELD

The invention relates to a flat image detector and a method for the generation of medical digital images, wherein in particular indirectly converting X-ray flat detectors for image generation are or will be embodied in optimized form.

BACKGROUND

X-ray systems are employed for imaging purposes for diagnostic investigation and for interventional operations for example in cardiology, radiology and neurosurgery.

By way of example, FIG. 1 shows such an X-ray system or such an X-ray diagnostic device, which has at least one C-arm 4 mounted rotatably on a stand, on the ends of which are attached an X-ray radiation source 6, for example an X-ray emitter or tube, and an X-ray image detector 5, and a high voltage generator for the generation of tube voltage. The stands holding the C-arm can be fixed to the floor, ceiling or side wall. The C-arm 4 can also be controlled or guided by a robot 8. The X-ray image detector 5 can be a rectangular or square, flat semiconductor detector, which is preferably made of amorphous silicon (aSi).

In the optical path of the X-ray radiation source 6 is located a patient couch 3 to accommodate an area of a patient 7 to be examined. An image system 2 is connected to the X-ray diagnostic device, which receives and processes the image signals from the X-ray image detector 5. The processed image signals can then be displayed on a display device 1 connected to the image system 2.

The X-ray radiation source 6 emits a beam emanating from a beam focus of the X-ray radiation source 6, which strikes the X-ray image detector 5.

The X-ray radiation source 6 and the X-ray image detector 5 in each case travel around the area to be examined, in such a way that the X-ray radiation source 6 and the X-ray image detector 5 lie on opposite sides of the area.

To create 3-D data sets, the rotatably mounted C-arm 4 with the X-ray emitter and X-ray image detector 5 is rotated in such a way that it moves around an area of the patient 7 to be examined (for example the liver) on an orbit of the X-ray radiation source 6 and an orbit of the X-ray image detector 5. The orbits can be traversed completely or partially to produce a 3-D-data set.

X-ray flat detectors are currently being introduced to a large extent universally as X-ray detectors in many areas of X-ray technology, for example in radiography or also in interventional angiography and cardiology.

The ability of today's X-ray flat detectors to make efficient use of the incoming X-ray radiation R for image generation is high, but does not reach the theoretical limit.

FIG. 2 shows an X-ray flat image detector 5, such as is for example used in FIG. 1. The structural principle of such an indirectly converting flat detector, comprising a scintillator, an array comprising photodiodes D and switch element S and an active readout matrix made of amorphous silicon and activation and readout electronics, which has, inter alia, a line driver Z and a multiplexer amplifier M.

Depending on the beam quality, the quantum efficiency for a scintillator SZ made of Cesium Iodide (CsI) with a layer thickness of for example 600 µm is between about 50% and 80%, as is described for example in M. Spahn, "Flat detectors and their clinical applications", Eur Radiol (2005), 15: 1934-1947. The local frequency dependent DQE(f) (="Detective Quantum Efficiency") is hereby subject to an upper limit, and for typical pixel sizes lies for example between 150-200 llm and for local frequencies of 1-2 lp/mm (line pairs per mm) of interest for the applications, even significantly lower.

Other converter materials used in angiography or radiography, such as for example scintillators made of Gd2S20 or direct converters made from Se, exhibit similar basic behavior, lie for currently possible detectors at an even lower level, comparatively speaking. Above the K-edge it is basically the case that with increasingly harder radiation, the absorption and consequently the DQE(f) diminishes.

Harder radiation occurs very frequently in interventional cardiology applications, on the one hand in the case of obese patients, but also as a result of necessary oblique projections, which geometrically call for penetration of a patient of up to 40 cm and more. The task of an X-ray system is also in these cases still to deliver images of acceptable quality. Here a number of effects now overlap to the disadvantage of the image quality:

Current limitations of the X-ray generation system (tubes, generator) result in the fact that in the case of steep angulations the prescribed detector dose can only be achieved at all by increasing the quantum energy. Voltages of 100 kV or more are then required.

hardening of the radiation by means of prefiltering further hardening of the radiation upon penetration of the patient, as a result of which the contrast is reduced once more.

limitation of the patient's initial dose as in fluoroscopy, which with prescribed detector dose and increasing object thickness (for example steep angulations) can only be achieved through increasing hardening of the radiation.

However hardened radiation leads—as described above—to a lower quantum efficiency and thus suboptimal image quality.

Some of the most important properties of scintillators are as follows:

High quantum efficiency, in order to make optimum use of the generated dose.

High number of secondary quanta per absorbed X-ray quantum RQ (see FIG. 3) of X-ray radiation R, in order preferably to guarantee a high signal-to-noise gap ("noise" should here be taken to refer to electronic noise).

High optical transparency, in order to ensure as little as possible of the generated light is reabsorbed into the material again, Narrow point spread function (or high MTF '=' Modulation Transfer Function), that is the property that the generated light can be detected in a locally limited manner perpendicular to the direction of incidence.

Further properties are for example speed or low lag behavior.

There are various possibilities for realizing subsidiary aspects of the abovementioned properties of scintillators.

In flat detectors conventionally used for angiography and radiography, large-area CsI of needle-shaped structure and 600 µm layer depth or more is employed, for example. The advantages are a good MTF, a high number of secondary quanta and good transparency. The absorption properties are however suboptimal in the case of hard radiation. Since the MTF suffers as a result of greater layer depths (longer transmission paths) and, at the same time, significantly thicker layers are more difficult to manufacture and as the case may be, less economical, this is not a suitable solution.

In computed tomography (CT) $Gd_2S_2O$ is used, with significantly better absorption properties. The non-structured material nevertheless exhibits considerably worse resolution properties (MTF), which can only be compensated for by means of a discrete structure (optical separation of the scintillators from pixel to pixel).

This can be realized for typical CT-pixel sizes of around 1 mm, but not for pixel sizes of 150-200 µm, such as are used in angiography/radiography. The discrete structure of the scintillator layer in computed tomography additionally permits greater layer thicknesses, so that quantum efficiencies of 95% or more are attained.

FIG. 3 (a)-(d) shows a number of possible embodiments for flat detectors in angiography or radiography. The active readout matrix MX with photodiodes is on the side facing away from the X-ray. The main advantages and disadvantages of these embodiments are listed below:

FIG. 3(a) shows an unstructured scintillator SZ without reflector RF and relatively wide point spread functions PBF (corresponding to a "poor" MTF) through the absence of structuring.

The absorption level influences the PBF (applies to each of the 4 variants), wherein less light yield is produced as a result of loss of light.

FIG. 3(b) shows an unstructured scintillator SZ with reflector RF and still relatively wide point spread functions PBF through an absence of structuring, wherein a higher light yield is generated by the reflector.

FIG. 3(c) shows a structured scintillator SZ: improved PBF through structuring (a part of the light quanta L is directed within the longitudinal crystals (within the total angle of reflection at the CsI-air transition). This solution approach is less economical as a result of the structuring.

FIG. 3(d) shows a structured, thicker scintillator SZ with reflector RF. This results in higher absorption, lower economic viability as a result of structuring and greater thickness, as well as a higher light yield and wider PBF (corresponds to a "poorer" MTF).

SUMMARY

According to various embodiments the disadvantages already set out can be overcome.

According to an embodiment, a flat image detector, in particular suitable for a medical X-ray device, may comprise at least one active matrix made up of pixel-readout units, wherein the light generated in the scintillator can be read out on both sides in the direction of the incoming X-ray radiation in front of and behind the scintillator with the aid of such an active matrix in each case arranged on each side of the scintillator.

According to a further embodiment, the flat image detector can be embodied for use in a medical X-ray device. According to a further embodiment, the readout units may have photodiodes and switch elements. According to a further embodiment, the active matrices may generate images, which are combined by means of addition or averaging, further processed on an individual basis or linked by means of a suitable linear combination. According to a further embodiment, at least one part of the active matrices can be embodied from an organic conductive material or an organic semiconductive material. According to a further embodiment, the scintillator can be embodied in an unstructured or structured form. According to a further embodiment, a matrix comprises amorphous silicon, can be separated on a glass substrate on the side facing or the side facing away from the X-ray radiation. According to a further embodiment, a matrix may comprise amorphous silicon, which is separated on a lightwave and/or X-ray transparent plastic film on the side facing and/or the side facing away from the X-ray radiation.

According to another embodiment, in a method for the generation of medical digital images with the aid of at least one active matrix of a flat image detector made up of pixel-readout units, in particular as described above, the light generated in the scintillator is read out on both sides in the direction of the incoming X-ray radiation in front of and behind the scintillator, with the aid of such an active matrix in each case arranged on each side of the scintillator, and thereby at least one medical digital image is generated.

BRIEF DESCRIPTION OF THE DRAWINGS

Further advantages, details and developments are evident from the following description of exemplary embodiments in connection with the drawings, wherein:

FIG. 3 shows a plurality of conventional solution approaches with advantages and disadvantages explained in the introduction. (a) unstructured scintillator. Dependence of the point spread function on the point of absorption. (b) unstructured scintillator with reflector (more light, worse PBF). (c) Structured scintillator (better PBF). (d) Thicker structured scintillator with reflector (higher absorption, worse PBF, more light)

DETAILED DESCRIPTION

Figure 1:
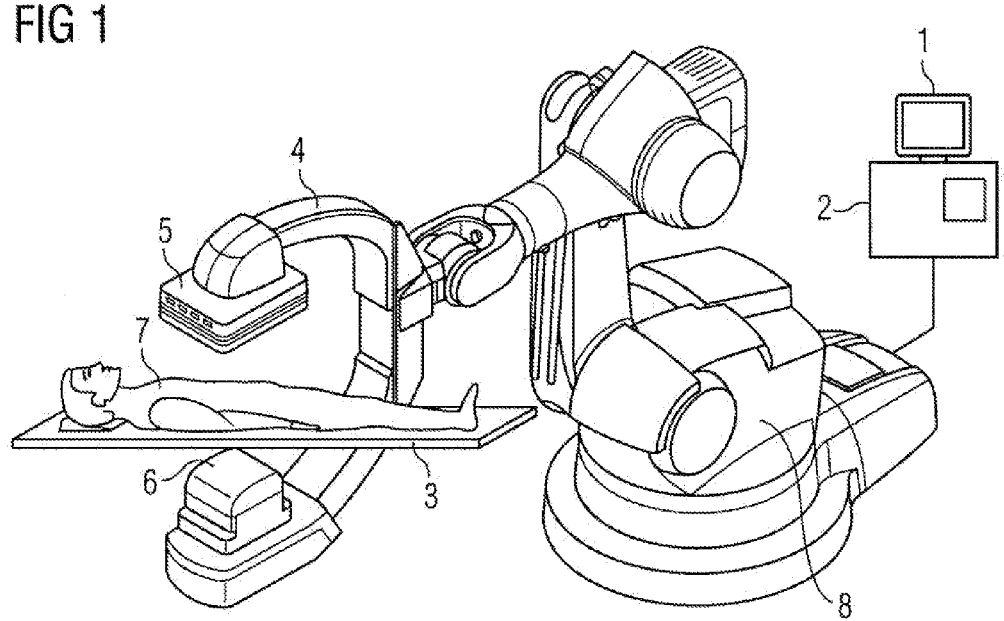
FIG. 1 shows the X-ray system mentioned in the introduction, with robot-controlled C-arm (in outline form) preferably for radiology, cardiology or neurosurgery.
Figure 2:
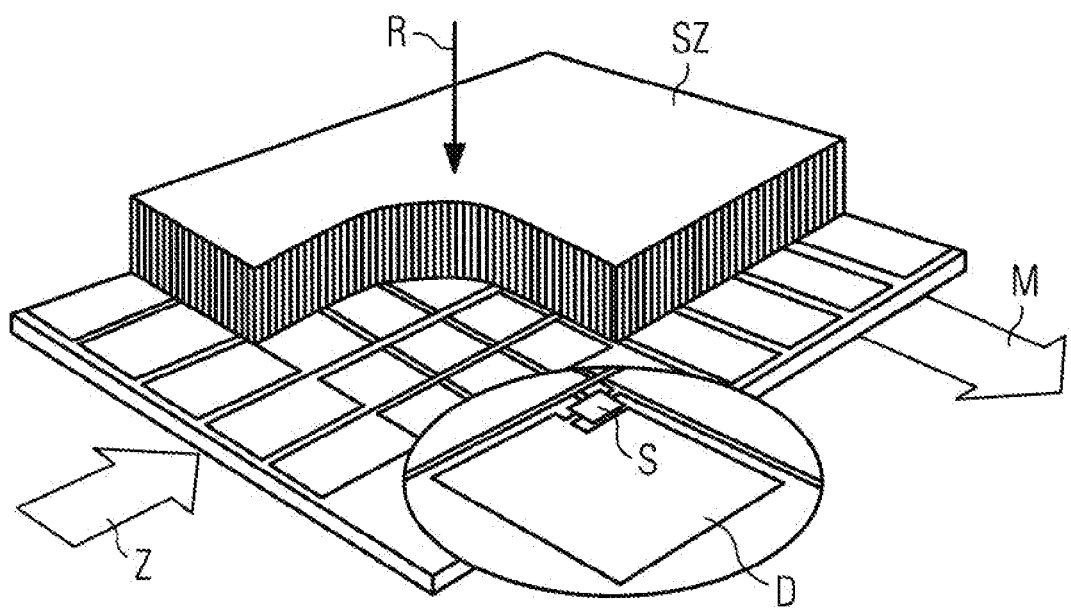
FIG. 2 shows the schematic structure of an X-ray flat image detector described in the introduction, comprising scintillator and active readout matrix (photodiode and switch element)

According to various embodiments, a flat image detector, which is in particular suitable for a medical X-ray device can be equipped with at least one active matrix made up of pixel-readout units, wherein the light generated in the scintillator can be read out on both sides in the direction of the incoming X-ray radiation in front of and behind the scintillator, with the aid of such an active matrix in each case arranged on each side of the scintillator.

The flat image detector is preferably embodied for use in a medical X-ray device.

According to other embodiments, in a method for the generation of medical digital images with the aid of at least one active matrix of a flat image detector made up of pixel readout units, in particular as described above, the light generated in the scintillator is read out on both sides in the direction of the incoming X-ray radiation in front of and behind the scintillator, with the aid of such an active matrix in each case arranged on each side of the scintillator, and where applicable at least one medical digital image is thereby generated.

In one embodiment the readout units have photodiodes and switch elements.

In one embodiment, the active matrices generate images, which are combined by means of addition or averaging, further processed on an individual basis or linked by means of suitable linear combinations.

In one embodiment, at least one part of the active matrices (MX, MX2) is embodied from an organic conductive material or an organic semiconductive material.

In one embodiment, the scintillator (SZ) is embodied in an unstructured or structured form.

In one embodiment, a matrix (MX, MX2) comprises amorphous silicon, which is separated on a glass substrate.

In one embodiment, the amorphous silicon is separated on a light wave and/or X-ray transparent plastic film.

If the separation is on plastic, this then has the advantage that the layer (as it is very much thinner and also made of a material other than glass) is X-ray transparent. Such an a-Si-on-plastic layer is advantageous on the side facing towards the X-ray source, as it absorbs little of the incoming X-ray radiation before it meets the scintillator.

ADVANTAGEOUS EFFECTS OF THE VARIOUS EMBODIMENTS

Various prerequisites for an improved DQE(f) for each design are now simultaneously optimized:
- optimization of the scintillator thickness for improvement of the absorption
- optimization of the detection of the secondary quanta (light)—maximization of the signal
- optimization of the spatial resolution (minimization of the point spread function or maximization of the MTF(f) respectively)

FIGS. 4 to 7 show the principle of possible embodiments, represented by way of example.

The optimization described above is enabled in that the light generated in the scintillator SZ is read out on both sides, that is in the direction of the incoming X-ray radiation R in front of and behind the scintillator layer (see FIGS. 4 to 7). To this end, an active readout matrix, comprising a pixel matrix MX, MX2 made up of photodiodes and switch elements is arranged on both sides. Two images are thereby produced.

By means of the double-sided readout the signal is maximized without the use of reflective layers. By avoiding reflective layers the MTF is additionally optimized, as the light travels the shortest possible paths before absorption in the photodiodes (in MX or MX2). By means of the optimization of the spatial resolution the scintillator layer thickness can in turn be increased, and thus the X-ray absorption optimized.

The digital images generated in both readout matrices can now either be combined by means of addition or averaging, further processed on an individual basis or also, in more general terms, linked by one or any linear combinations.

Figure 4:
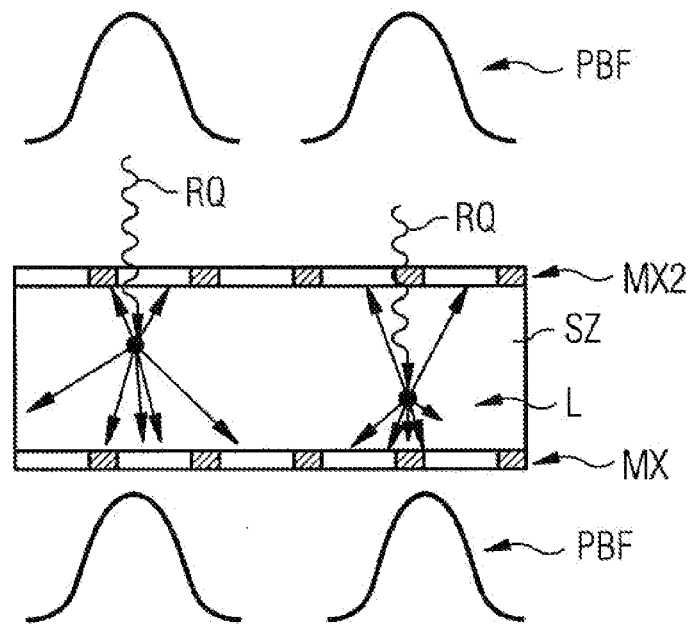
FIG. 4 shows a double-sided readout with unstructured scintillator according to various embodiments.
Figure 5:
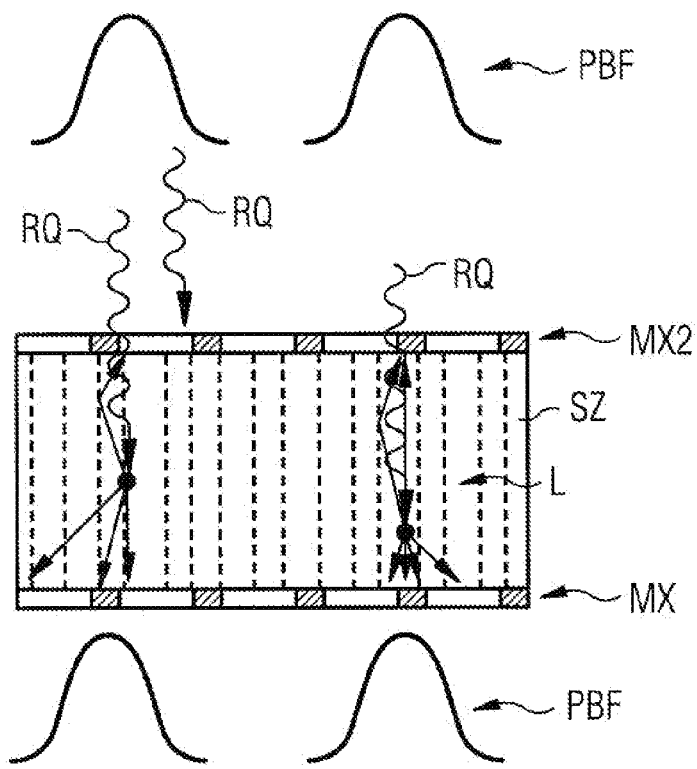
FIG. 5 shows a double-sided readout with structured scintillator according to various embodiments.
Figure 6:
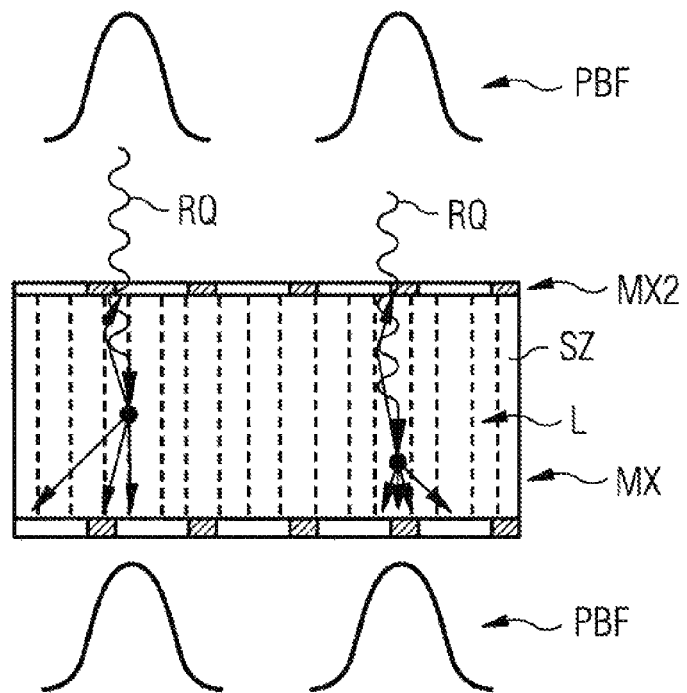
FIG. 6 shows a double-sided readout according to various embodiments, in which the X-ray side readout (photodiode, active pixel-matrix) is made of a minimally (X-ray) absorbing film.
Figure 7:
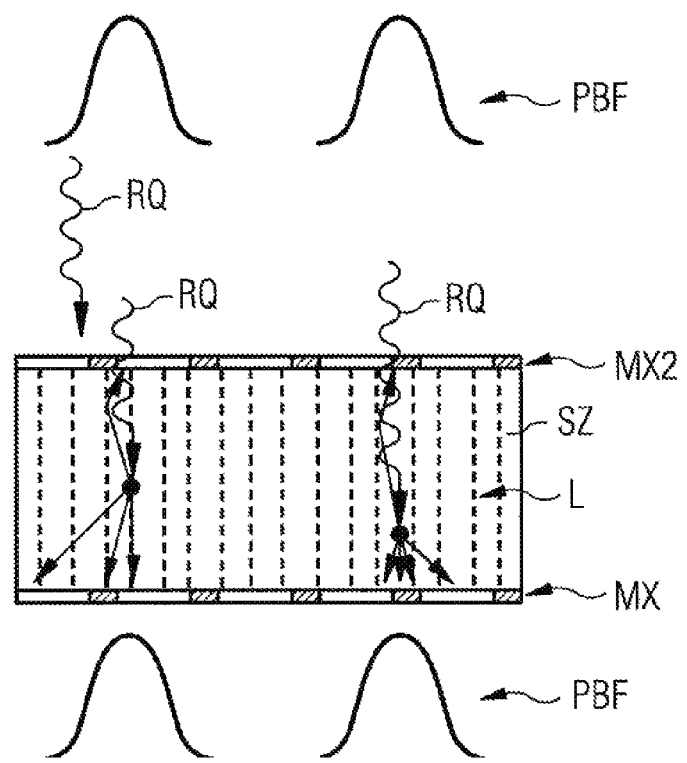
FIG. 7 shows a double-sided readout according to various embodiments, in which both readouts (photodiode, active matrix) are prepared from a minimally (X-ray) absorbing film.

The various embodiments encompasses any form of scintillator, for example unstructured (as for example shown in FIG. 4) or structured (such as shown for example in the FIGS. 5 to 7).

There is no restriction in the embodiment of the readout matrices.

In one embodiment, conventional readout matrices made of amorphous silicon can be used, which are separated on a glass substrate (see FIG. 4, 5).

Another embodiment, which essentially circumvents the disadvantage of this embodiment involving the partial absorption of X-ray radiation in the glass substrate before entry into the scintillator, uses at least one thin, light wave (LW), X-ray transparent plastic film, on which the amorphous silicon is separated (see FIG. 6, 7). These can, for example, be embodied on the basis of polyethylene terephthalate (PET), polyethylene naphtalate (PEN), polyimide (for example Dupont Kapton), polysulfone ether or polycarbonate.

The following embodiments are possible here: use of the readout matrix made of plastic film (see FIG. 6) on the side facing the X-ray radiation and use of the conventional readout matrices made of amorphous silicon separated on glass substrate.

Use of the readout matrix made of plastic film (see FIG. 7) on the side facing and facing away from the X-ray radiation.

Furthermore, readout matrices based on organic semiconductors can be employed which can be applied to thin, LW, X-ray transparent substrates.

LIST OF REFERENCE CHARACTERS

1 Display device
2 Image system
3 Patient couch
4 C-arm
5 X-ray flat image detector
6 X-ray source
7 Patient
8 Robot
D Photodiode
L Light quantum
M Multiplexer amplifier
MX,MX2 (Pixel) matrix
PBF Point spread function
R X-ray radiation
RF Reflector
RQ X-ray quantum
S Switch, switch element
SZ Scintillator
Z Line driver

What is claimed is:

1. A flat image detector comprising:
a scintillator configured to convert X-ray radiation into light;
a first active matrix arranged on a first side of the scintillator; and
a second active matrix arranged on a second, opposite side of the scintillator, such that the scintillator is arranged between the first and second active matrices;
wherein each of the first and second active matrices comprises a two-dimensional array of pixel-readout units of a substantially similar layout, each pixel-readout unit having a substantially equivalent size;
wherein the flat image detector is arranged with an outer surface of the first active matrix acing a source of incident X-ray radiation;
wherein the flat image detector is configured such that, upon receiving the incident X-ray radiation through the first active matrix and into the scintillator, both the first active matrix and the second active matrix arranged on opposite sides of the scintillator are configured to read out light generated in the scintillator, wherein the first active matrix is configured to generate a first two-dimensional image and the second active matrix is configured to generate a second two-dimensional image; and electronics configured to combine the first two-dimensional image generated by the first active matrix with the second two-dimensional image generated by the second active matrix by addition or averaging, further process the first and second two-dimensional images on an individual basis, or link the first and second two-dimensional images using a linear combination.

2. The flat image detector according to claim 1, wherein the flat image detector is embodied for use in a medical X-ray device.

3. The flat image detector according to claim 1, wherein the readout units comprises photodiodes and switch elements.

4. The flat image detector according to claim 1, wherein at least one part of the active matrices is embodied from an organic conductive material or an organic semiconductive material.

5. The flat image detector according to claim 1, wherein the scintillator is embodied in an unstructured form.

6. The flat image detector according to claim 1, wherein the scintillator is embodied in a structured form.

7. The flat image detector according to claim 1, wherein a matrix comprises amorphous silicon, which is separated on a glass substrate on the side facing or the side facing away from the X-ray radiation.

8. The flat image detector according to claim 1, wherein a matrix comprises amorphous silicon, which is separated on at least one of a light wave and X-ray transparent plastic film on at least one of the side facing and the side facing away from the X-ray radiation.

9. A method for the generation of medical digital images, the method comprising:

receiving X-ray radiation at a flat image detector comprising:
  a scintillator configured to convert X-ray radiation into light;
  a first active matrix arranged on a first side of the scintillator; and
  a second active matrix arranged on a second, opposite side of the scintillator, such that the scintillator is arranged between the first and second active matrices;
  each of the first and second active matrices comprising a two-dimensional array of pixel-readout units of a substantially similar layout, each pixel-readout unit having a substantially equivalent size;

wherein the flat image detector is arranged with an outer surface of the first active matrix facing a source of incident X-ray radiation, such that the received X-ray radiation passes through the first active matrix and into the scintillator;

the scintillator converting the received X-ray radiation into light;

both the first active matrix and the second active matrix arranged on opposite sides of the scintillator reading out light generated in the scintillator, such that the first active matrix generates a first two-dimensional image and the second active matrix generates a second two-dimensional image; and generating at least one medical digital image by combining the first two-dimensional image with the second two-dimensional image using addition or averaging, further processing the first and second two-dimensional images on an individual basis, or linking the first and second two-dimensional images using a linear combination.

10. The method according to claim 9, wherein the flat image detector is embodied for use in a medical X-ray device.

11. The method according to claim 9, wherein the readout units comprises photodiodes and switch elements.

12. The method according to claim 9, wherein at least one part of the active matrices is embodied from an organic conductive material or an organic semiconductive material.

13. The method according to claim 9, wherein the scintillator is embodied in an unstructured.

14. The method according to claim 9, wherein the scintillator is embodied in a structured form.

15. The method according to claim 9, wherein a matrix comprises amorphous silicon, which is separated on a glass substrate on the side facing or the side facing away from the X-ray radiation.

16. The method according to claim 9, wherein a matrix comprises amorphous silicon, which is separated on at least one of a lightwave and X-ray transparent plastic film on at least one of the side facing and the side facing away from the X-ray radiation.

17. An X-ray system, comprising:

an X-ray source configured to generate X-ray radiation; and a flat image detector configured to receive incident X-ray radiation from the X-ray source, the flat image detector comprising:
  a scintillator configured to convert X-ray radiation into light;
  a first active matrix arranged on a first side of the scintillator; and
  a second active matrix arranged on a second, opposite side of the scintillator, such that the scintillator is arranged between the first and second active matrices;
  wherein each of the first and second active matrices comprises a two-dimensional array of pixel-readout units of a substantially similar layout, each pixel-readout unit having a substantially equivalent size;
  wherein the flat image detector is arranged with an outer surface of the first active matrix facing the incident X-ray radiation from the X-ray source, such that the incident X-ray radiation passes through the first active matrix and into the scintillator; and
  wherein the flat image detector is configured such that, upon receiving the incident X-ray radiation through the first active matrix and into the scintillator, both the first active matrix and the second active matrix arranged on opposite sides of the scintillator are configured to read out light generated in the scintillator, wherein the first active matrix is configured to generate a first two-dimensional image and the second active matrix is configured to generate a second two-dimensional image; and
  electronics configured to combine the first two-dimensional image generated by the first active matrix with the second two-dimensional image generated by the second active matrix by addition or averaging, further process the first and second two-dimensional images on an individual basis, or link the first and second two-dimensional images using a linear combination.

* * * * *